US010904272B2

(12) United States Patent
Park et al.

(10) Patent No.: US 10,904,272 B2
(45) Date of Patent: Jan. 26, 2021

(54) CONSUMER THREAT INTELLIGENCE SERVICE

(71) Applicant: Allstate Insurance Company, Northbrook, IL (US)

(72) Inventors: Jason D. Park, Chicago, IL (US); John S. Parkinson, Lake Forest, IL (US)

(73) Assignee: Allstate Insurance Company, Northbrook, IL (US)

( * ) Notice: Subject to any disclaimer, the term of this patent is extended or adjusted under 35 U.S.C. 154(b) by 123 days.

(21) Appl. No.: 15/802,049

(22) Filed: Nov. 2, 2017

(65) Prior Publication Data
US 2019/0132337 A1    May 2, 2019

(51) Int. Cl.
*H04L 29/06*    (2006.01)
*G06F 21/62*    (2013.01)

(52) U.S. Cl.
CPC ...... *H04L 63/1416* (2013.01); *G06F 21/6263* (2013.01)

(58) Field of Classification Search
CPC .. G06F 21/6263; G06F 21/554; G06F 21/552; G06F 21/566; H04L 63/1416
USPC .......................................................... 726/23
See application file for complete search history.

(56) References Cited

U.S. PATENT DOCUMENTS

| | | | |
|---|---|---|---|
| 2012/0136678 A1 | 5/2012 | Steinberg | |
| 2015/0326613 A1* | 11/2015 | Devarajan | H04L 61/2007 726/1 |
| 2015/0381641 A1 | 12/2015 | Cabrera et al. | |
| 2017/0085595 A1* | 3/2017 | Ng | G06N 20/00 |
| 2017/0331839 A1* | 11/2017 | Park | G06F 21/6245 |
| 2017/0366571 A1* | 12/2017 | Boyer | H04L 63/1416 |
| 2018/0027001 A1* | 1/2018 | Park | H04L 63/1416 726/23 |
| 2018/0077187 A1* | 3/2018 | Garman | H04L 63/1441 |
| 2018/0097790 A1* | 4/2018 | Caldera | H04L 63/08 |
| 2019/0050600 A1* | 2/2019 | Sahoo | G06F 21/6281 |
| 2019/0068604 A1* | 2/2019 | Legault | H04L 63/102 |
| 2019/0121979 A1* | 4/2019 | Chari | G06N 20/00 |

OTHER PUBLICATIONS

Feb. 25, 2019—(WO) International Search Report—App PCT/US2018/058379.

* cited by examiner

*Primary Examiner* — Kambiz Zand
*Assistant Examiner* — Benjamin A Kaplan
(74) *Attorney, Agent, or Firm* — Banner & Witcoff, Ltd.

(57) ABSTRACT

Methods, computer-readable media, software, and apparatuses may assist in proactively warning a consumer they are a victim or possible target of a cyber-attack or cyber-threat. To discover whether a consumer may be a victim, the methods, computer-readable media, software, and apparatuses will monitor the Surface Web, Deep Web, and Dark Web for potential cyber-threats and cyber-attacks. If one is discovered, the methods, computer-readable media, software, and apparatuses will compare the criteria of victims of targeted in the cyber-attack and compare that criteria with consumer profiles. If a consumer profile matches the criteria, the methods, computer-readable media, software, and apparatuses will notify the consumer of the threat.

20 Claims, 4 Drawing Sheets

CONSUMER THREAT INTELLIGENCE SERVICE

FIELD OF ART

Aspects of the disclosure generally relate to methods and computer systems, including one or more computers particularly configured and/or executing computer software. More specifically, aspects of this disclosure relate to systems for identifying, categorizing, and managing online cyber-security threats to consumers.

BACKGROUND

Protecting a consumer's confidential information in today's online environment is difficult due to the increased connectivity and the increasing portion of their daily lives on the internet, evidenced by the number of consumer accounts accessible via internet enabled computing devices. But the internet is vaster than many consumers appreciate, meaning consumers have much more exposure than they are aware. Most consumers only interact with the internet via the World Wide Web, which they often conflate with the full internet. However, the internet is just a network of various computers and computing devices, whereas the World Wide Web is a specific way of exchanging information over the internet. Generally, the World Wide Web allows consumers to access information formatted as webpages and identified by Uniform Resource Locators (URLs) that is connected through a network of hypertext links.

The World Wide Web is often referred to as having at least three different parts: the Surface Web, the Deep Web, and the Dark Web. Although these designations blur, there are some generally accepted definitions. The Surface Web is the part of the World Wide Web that consumers are most familiar. It consists of webpages that search engines (such as Google, Bing, or Yahoo) can find and index. Search engines depend on links to navigate. Therefore, the Surface Web includes all webpages hyperlinked to other webpages.

The Deep Web consists of anything a search engine cannot find and index. This includes any webpage that does not have a specific link. Examples are websites with search boxes that require a text input, websites that require logins to enter, and websites set up at home that can only be accessed through its IP address. The Deep Web therefore consists of information that a consumer could access but a search engine could not.

The Dark Web is a part of the Deep Web where the users remain anonymous. The Dark Web is inaccessible through the standard web browser and requires searching different networks, such as TOR, Freenet, or I2P. Because users of the Dark Web are anonymous, the Dark Web lends itself to hackers or others with criminal interests. Despite most consumers never directly interacting with the Dark Web, their information can still be hacked and traded or sold over the Dark Web.

Therefore, as consumers continue to gain an ever-increasing presence in online environments, they will also be exposed to a growing landscape of cyber-security threats. In addition, as these threats increase, it is in the best interest of the consumer to be proactive in detecting cyber-threats and/or cyber-attacks.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for detection of a cyber-attack by monitoring the Surface Web, Deep Web, and Dark Web. If a cyber-attack is detected, the described cyber security system may then determine the criteria used to target victims of the cyber-attack. The described cyber-security system will then compare the criteria used to target victims with consumer profiles.

In some aspects, the cyber-security system will create consumer profiles from information provided by the consumer and/or collected from monitoring the consumer's online activity. The cyber-security system may periodically update these consumer profiles based on additional information provided by the consumer or collected from monitoring the consumer's online activity.

In other aspects, the cyber-security system may generally notify consumers that a cyber-attack has occurred. Alternatively, the cyber-security system may also notify specific consumers that although their data may not be compromised, their profile fits that of potential victims of the cyber-attack. The cyber-security system may also determine which specific consumers were victims of the cyber-attack and notify those consumers whether their information was compromised. The cyber-security system may additionally make recommendations of actions a consumer may take to protect themselves from the cyber-attack. Further, the cyber-security system may also, in operation, assist in or automate the closing of accounts based on the cyber-attack.

In some aspects, the cyber-security system may include a cyber-security account analysis system and a cyber-security data processing system. The cyber-security system may include at least one processor and a memory unit storing computer-executable instructions. The cyber-security system may be configured to, in operation, generate a consumer profile based on consumer information, scan a consumer device to determine potential security threat, and associate the consumer device and the results of the scan with the generated consumer profile. The cyber-security system may also be configured to scan the Surface Web, Deep Web, and Dark Web for potential cyber-attacks. If a cyber-attack is detected, the cyber-security system may then determine the criteria used to find targets of the cyber-attack. Then, the cyber-security system may then compare consumer profiles to the criteria to find targets of the cyber-attack. If a consumer profile matches the criteria used to find targets, the cyber-security system may also notify the consumer with the matching profile.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for proactively alerting consumers of possible cyber-security threats. A consumer may be presented with a wide range of cyber-security threats, including phishing scams, cyber-extortion (e.g., ransomware), false/fraudulent account creation, credit card theft, credit score reduction, and banking theft. By monitoring the full internet, including the Deep Web and Dark Web, a consumer may be warned of a likely cyber-attack, and a cyber-security system can assist a user in combatting the threat against the individual by closing compromised accounts.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
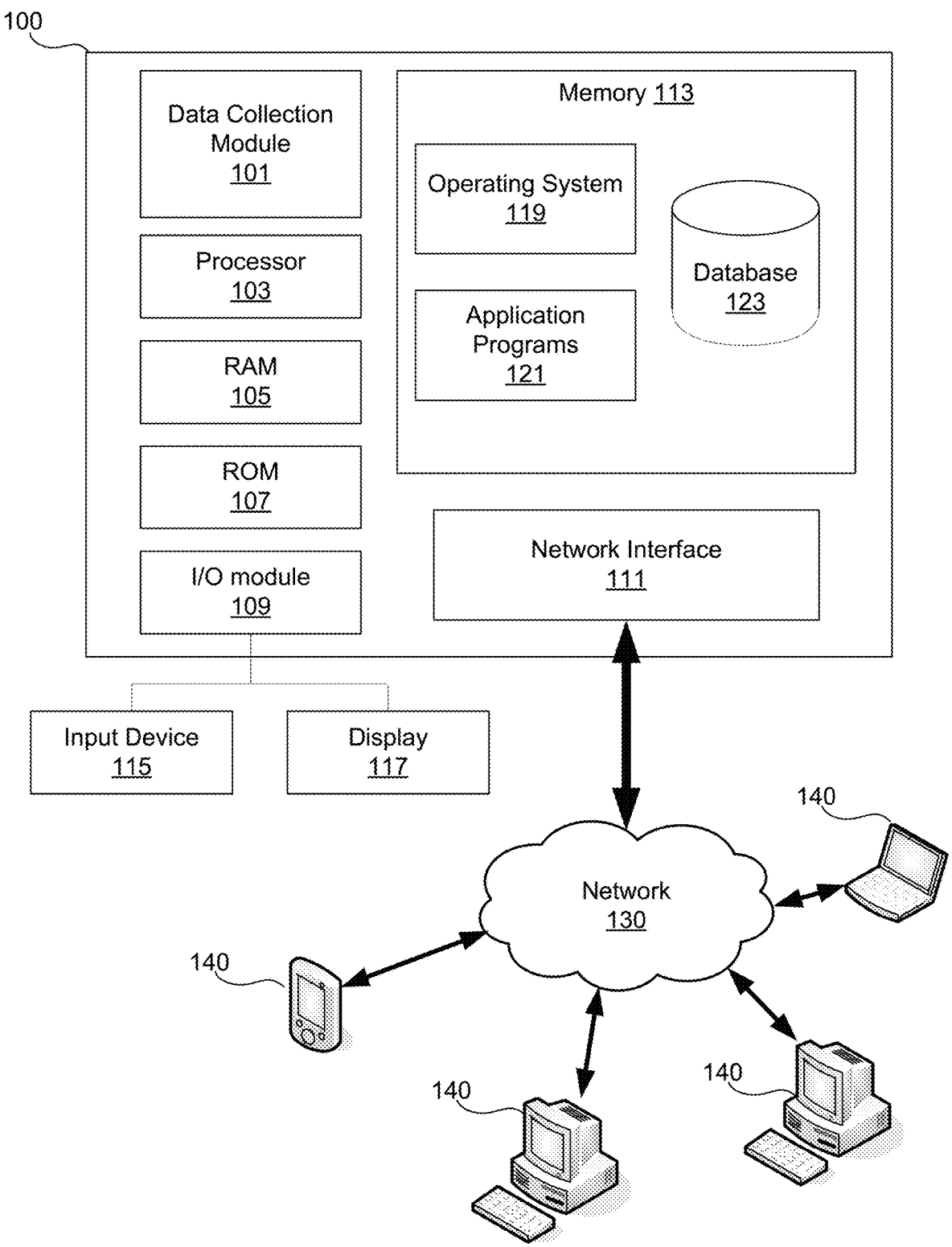
FIG. 1 illustrates an example cyber-security device that may be used in accordance with one or more aspects described herein.

In one or more arrangements, aspects of the present disclosure may be implemented with a computing device. FIG. 1 illustrates a block diagram of an example cyber-security device 100 that may be used in accordance with aspects described herein. The cyber-security device 100 may be a computing device, such as personal computers (e.g., desktop computers), servers, laptop computers, notebooks, tablets, smartphones, vehicles, home management devices, home security devices, or smart appliances. The cyber-security device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, cyber-security device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the security monitoring device 100 and its associated components, including RAM 105, ROM 107, an input/output (I/O) module 109, a network interface 111, and memory 113. For example, the data collection module 101 and processor (s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the security monitoring device 100 may provide input data. The I/O module 109 may also be configured to be connected to a display device 117, such as a monitor, television, or touchscreen, and may include a graphics card. The display device 117 and input device 115 are shown as separate elements from the cyber-security device 100; however, they may be within the same structure. On some cyber-security devices 100, the input device 115 may be operated by users to interact with the data collection module 101, including providing user information and/or preferences, device information, account information, and warning/suggestion messages, as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the cyber-security device 100 to perform various functions. For example, memory 113 may store software used by the cyber-security device 100, such as an operating system 119 and application programs 121, and may include an associated database 123.

The network interface 111 allows the cyber-security device 100 to connect to and communicate with a network 130. The network 130 may be any type of network, including a local area network (LAN) and/or a wide area network (WAN), such as the Internet, a cellular network, or satellite network. Through the network 130, the cyber-security device 100 may communicate with one or more other computing devices 140, such as laptops, notebooks, smartphones, tablets, personal computers, servers, vehicles, home management devices, home security devices, or smart appliances. The computing devices 140 may also be configured in a similar manner as cyber-security device 100.

The network interface 111 may connect to the network 130 via communication lines, such as coaxial cable, or fiber optic cable, or wirelessly using a cellular backhaul or a wireless standard, such as IEEE 802.11, IEEE 802.15, or IEEE 802.16. In some embodiments, the network interface may include a modem. Further, the network interface 111 may use various protocols, including TCP/IP, Ethernet, File Transfer Protocol (FTP), and Hypertext Transfer Protocol (HTTP), to communicate with other computing devices 140. The network interface 111 may also communicate over other various networks including the TOR, Freenet, or I2P networks. Notably, network interface 111 has the ability to communicate with other computing devices 140 over the Surface Web, Deep Web, and Dark Web.

In some embodiments the cyber-security monitoring device 100 may be connected to the computing devices 140 to form a "cloud" computing environment. Cloud computing may substitute for the hardware of cyber-security system 100 as described in FIG. 1a (e.g., data collection module 101, processor(s) 103, RAM 105, ROM 107, and memory 113). In this embodiment, computing devices could upload the computer code replicating the functions of cyber-security device 100. This allows code-based cyber-security system 100 to operate without provisioning or managing servers. It further allows self-service, elasticity, and scalability of the system while saving costs on overhead. In this embodiment, certain events would trigger cyber-security system 100 to operate. For instance, every time a cyber-attack is detected, cyber-security system 100 would analyze the qualities of the consumer accounts that were part of the cyber-attack and compare those qualities to the consumer profiles. Cyber-security system 100 would then notify consumers in accordance with descriptions below.

Figure 2:
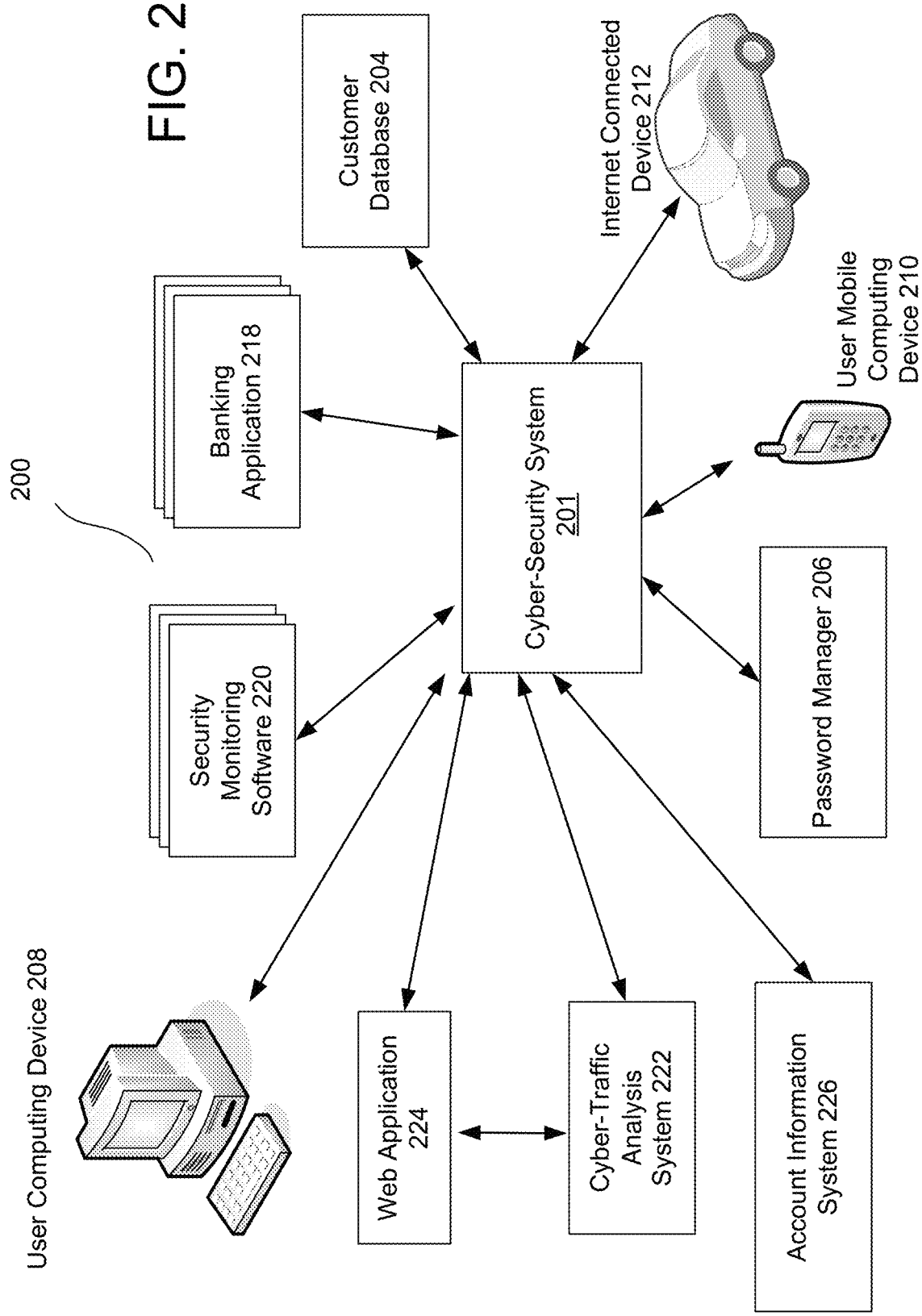
FIG. 2 shows a block diagram illustrating the system architecture for a cyber-security system in accordance with one or more aspects described herein.

FIG. 2 shows a block diagram illustrating system architecture 200 for a cyber-security system. A cyber-security system 201 may collect information from and transmit information to a consumer through various different channels such as a user mobile computing device 210, a user computing device 208, a password manager 206, banking application 218, and a web application 224. In some instances, the cyber-security system 201 may be a cyber-security computing device 100. Cyber-security system 201 may receive user data for its consumers through channels such as customer database 204, internet connected device 212, account information system 226, and user cyber-traffic analysis system 222. The cyber-security system 201 may communicate with one or more network-based accounts to detect information associated with a consumer account being communicated through a network.

In some embodiments, cyber-security system 201 may collect information from and transmit information to each of the various applications, databases, devices, and backend servers described in FIG. 2. Cyber-security system 201 may collect information about consumers by directly asking consumers to fill out profiles describing their online activity, including what accounts they already have such as accounts with credit cards, banks and other financial institutions. The profiles may be stored in account information system 226. Cyber-security system 201 may update the profiles by collecting information about consumers by monitoring their online real-time activity and interactions, including what monitoring which accounts they have and the frequency of use of accounts. Cyber-security system 201 may determine that the user may be engaging in particularly risky behavior, and may determine when and how to contact the consumer to inform the consumer of the potential for a data breach. Cyber-security system 201 may enable a plurality of different permutations of strategies such as the above example by being able to sense real-time consumer actions and consumer-related data flow through various different channels. By analyzing data relevant to that consumer, the cyber-security system 201 may inform various channels that it is communicatively coupled to regarding consumer-associated risks.

In some embodiments, cyber-security system 201 may communicate with a user (e.g., a consumer) and gather user data through banking application 218. Cyber-security system 201 may collect user data from interactions of the user with the user interface of the banking mobile application 218. The banking application 218 may allow the user to manage account preferences, manage financial accounts, view recent transactions, and/or review suspicious behavior. Cyber-security system 201 may track interactions with banking applications and/or receive notifications from the applications.

In some embodiments, a password manager 206 may assist the cyber-security system 201 in determining the presence of consumer accounts, and/or may assist the cyber-security system 201 in determining the quality of credentials for the consumer-associated accounts. The password manager 206 may inform the cyber-security system 201 of known accounts associated with the password manager 206, as well as the status of the credentials associated with those accounts. In some instances, the cyber-security system 201 may compare the accounts known to the password manager 206 with other accounts known to the cyber-security system 201 to determine what accounts are protected through password management.

In some embodiments, the customer may interact with the cyber-security system 201 using the user computing device 208, web application 224, and/or user mobile computing device 210. The user may be able to see any updates regarding security issues, seek remediation of those issues, and/or undergo further training regarding security practices. In some instances, if a cyber-attack occurs involving the consumer's data, the consumer may be presented an option to file an insurance claim for the cyber-attack via the cyber-security system 201 and/or through an associated application.

In some embodiments, the user cyber-traffic analysis system 222 may monitor user activity on social media networks and the Internet, including the Surface Web, Deep Web, or Dark Web. In some instances, the user cyber-traffic analysis system 222 may determine how much of a consumer's confidential (e.g., private) information is available electronically. Confidential information may comprise identity information such as name or birthday, marital status, family members, education, employment histories, online identities (e.g., user names on a social media account), financial information (e.g., banking numbers, credit card numbers), traceable assets (e.g., real estate, vehicles), court records, or other such information. By searching for electronically available information, the system may determine a "digital footprint" (e.g., a trail of data and information, available electronically and associated with the consumer). For example, the user cyber-traffic analysis system 222 may determine that a consumer's home address is available on 3 social media sites, 5 public web pages, and 2 dark web pages.

In some embodiments, the account information system 226 may maintain and dynamically update records of accounts for a consumer. For example, the account information system 226 may interface with social networking accounts associated with the consumer. In an embodiment, the collected user information may be used to generate a consumer profile for the consumer. The consumer profile may be updated periodically as new consumer information is gathered or received. In an embodiment, a consumer profile may be a categorization of what other or external entities know about the user such as what marketers know about a user, information found on social media about the user, the home state of the user and other potential categorizations.

The cyber-security system 201 also searches for instances where confidential information has become available or general indication that a potential cyber-security threat, such as a hack, was about to happen. For example, the cyber-security system 201 may begin by scanning various Surface Web sites, online forums, repositories, and social media for indications of cyber-security threats, which may be tied to the Deep Web and Dark Web. These indications may include advertisements for malware, offers of hacked consumer financial data, or wanted ads for hackers or consumer financial data. By using this information, cyber-security system 201 may then move to the Deep Web and Dark Web to collect additional information about the targets of the cyber-security threat, such as what criteria hackers are using to pick victims of a cyber-attack (e.g., type of operating system, device type, credit card company, bank, geographical region, account with specific retailer, social security numbers, model numbers, software versions, applications installed on the devices, or network capabilities). By analyzing the information learned from monitoring the Surface Web, Deep Web, and Dark Web, cyber-security system 201 will be able to detect threats, such as emerging hacks or phishing scams.

By using this information, cyber-security system 201 is able to compare the criteria to pick victims of a cyber-attack and compare it to consumer profiles. In that way, cyber-security system 201 is able to proactively warn consumers that they may be a potential victim of an upcoming cyber-attack. For instance, cyber-security system 201 may monitor the Dark Web for a general cyber-attack, such as a phishing scam. Cyber-security system 201 may discover the phishing scam directed at consumers with accounts with a specific credit card company and residing in a specific region. If consumers fit this profile, cyber-security system 201 would warn the consumers of an upcoming potential security threat such as by sending an alert to a user computing device 208 and/or user mobile computing device 210.

For instance, if cyber-security system 201 detects a cyber-attack, it may generally alert all consumers of the cyber-attack without specifically targeting certain consumer groups.

Alternatively or additionally, cyber-security system 201 may notify those consumers that have accounts or are likely to have accounts with the compromised website. In this embodiment, would determine the criteria used to determine targets of the cyber-attack. Cyber-security system 201 would then notify those consumers they fit the criteria of the targets of the cyber-attack, regardless of whether those consumers were actually victims of the cyber-attack.

Alternatively or additionally, the cyber-security system 201 may analyze which consumer accounts were specifically breached. The cyber-security system 201 then may alert specific consumers whether or not their account was breached.

Cyber-security system 201 may also search the Surface Web, Deep Web, and Dark Web for a specific consumer's information to see if that consumer is being targeted in a cyber-attack. For instance, cyber-security system 201 may determine that one of the Dark Web pages has published partial confidential consumer information, such as a consumer's credit card number or at least a credit card ending in "XXXX" associated with a specific consumer's address has been published. For example, the cyber-security system 201 may determine that the credit card number corresponds to the consumer and push an alert to an application on the user's mobile computing device 210, notifying the user that their credit card number may have been part of a cyber-attack. In another example, the cyber-security system 201 may notify a credit card company that a credit card number for the consumer was detected on the dark web. The consumer and/or service provider may then take action to reduce any potential damage resulting from the cyber-attack.

In some embodiments, in addition to collecting user information from mobile applications and web applications, user information for consumers may be collected from various other channels such as user computing device 208, user mobile computing device 210, and internet connected device 212. The cyber-security system 201 may determine devices associated with the consumer. The cyber-security data processing system may determine characteristics of those devices, such as their operating systems, update history, software on the devices, hardware characteristics, and so forth. This could be used by the cyber-security system 201 to updated the records of the accounts for consumers and refine searches of the Surface Web, Deep Web, and Dark Web for indications of a cyber-threat.

Figure 3:
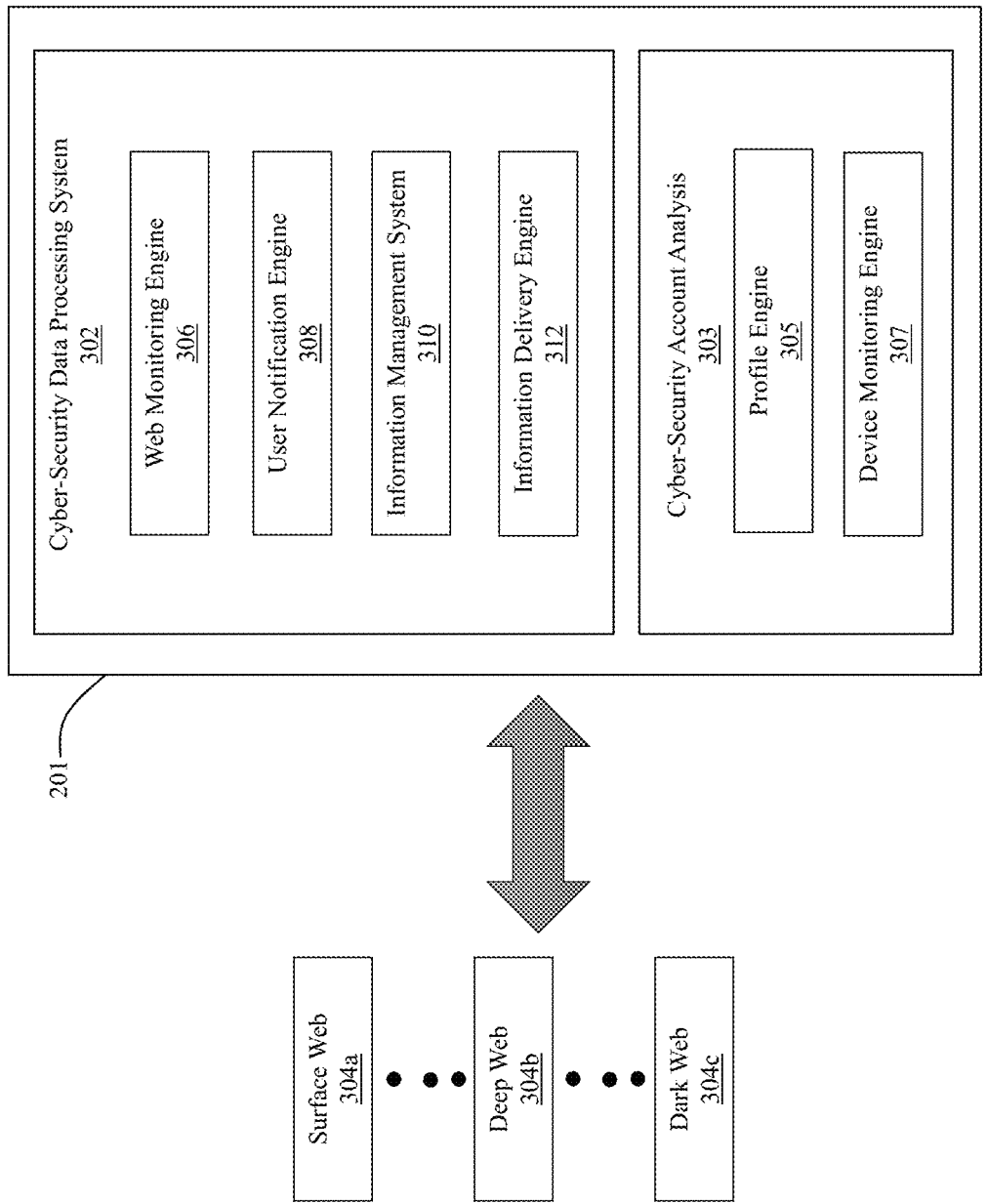
FIG. 3 illustrates a block diagram of a cyber-security system that collects information from various parts of the internet to help notify a consumer of a possible cyber-attack in accordance with one or more aspects described herein.

FIG. 3 illustrates a block diagram of cyber-security system 201 for monitoring information from various parts of the web to detect cyber-security threats. As shown in FIG. 3, the cyber-security system monitors the Surface Web 304a, Deep Web 304b, and Dark Web 304c to collect information related to the consumer to determine next steps to best serve the consumer.

In some embodiments, the cyber-security system 201 may comprise a cyber-security data processing system 302 and a cyber-security account analysis system 303. The cyber-security data processing system 302 may retrieve information from the web 304a-304c in order to determine the digital presence of a consumer. Web monitoring engine 306 may be configured to monitor (e.g., continuously monitor) each part of the web 304a-304c and report data of interest from any one of these data sources to the cyber-security system 201. For example, web monitoring engine 306 may monitor the Dark Web 304c to determine if account information associated with the consumer is part of cyber-attack. If the information is detected, it may be passed on to the cyber-security system 201 for analysis.

In an embodiment, cyber-security account analysis system 303 may generate a consumer profile at profile engine 305. The consumer profile may be generated using at least in part data received and/or collected from information the consumer or monitoring the web 304a-304c. The consumer profile may include details of the consumer including but not limited to a consumer's name, age, address, driver's license number, credit card or bank information, insurance policies, or networked devices associated with the consumer. In an embodiment, the consumer may themselves enter additional or confirm information found in their consumer profile through a mobile application or computing device interface. Additional information that may be entered by the consumer includes financial account details and/or verification of online accounts used by a consumer.

In an embodiment, the cyber-security system 201 may scan for devices associated with the consumer at the device monitoring engine 307. The cyber-security system 201 may identify devices on a network associated with the consumer and/or devices associated with the consumer's credentials. For example, the cyber-security system 201 may initiate a network scan, which may identify devices along a network and information corresponding to each device (e.g., device type, model numbers, operating systems, software versions, applications installed on the devices, or network capabilities).

In some embodiments, the cyber-security system 201 may determine when and through which means to notify a consumer of the risks of a cyber-attack and/or evidence of a potential cyber-attack according to preset rules and strategies calculated from the data gathered from the web 304a-304c. For example, the user notification engine 308 may determine a time to contact the consumer with a message and/or notification generated by the cyber-security system 201 upon analyzing activity on the Dark Web.

In some embodiments, the cyber-security system 201 may manage the various activities of each consumer and the status of various accounts associated with the consumer. For example, the information management system 310 may keep track of all of the information received from the web 304a-304c and may also manage a schedule of message delivery by communicating with the user notification engine 308.

In some embodiments, the cyber-security system 201 may determine which channel to use to communicate the decision of a strategy computed at the cyber-security system 201. For example, the information delivery engine 312 may detect which mobile application accessible to the user is the most appropriate channel on which to deliver the type of information that is scheduled to be delivered to the consumer and/or other target audience.

Figure 4:
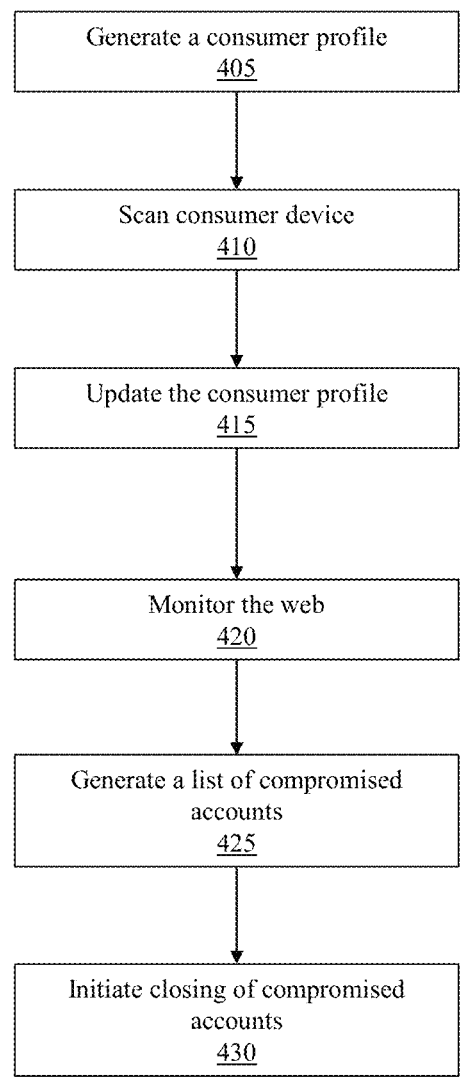
FIG. 4 illustrates an exemplary method for identifying accounts associated with a consumer and notifying a consumer of a possible cyber-attack in accordance with one or more aspects described herein.

FIG. 4 depicts a method for proactively warning a consumer about cyber-security threat. The method described notifies consumers when a cyber-attack has occurred and how they are at risk. Alternatively, the method can provide recommendations and assistance for closing compromised accounts.

At step 405, cyber-security system 201 may generate a consumer profile based on received and collected consumer information. The consumer information may be collected by the user cyber-traffic analysis system 222, which may continuously scan for updated consumer information (e.g., addresses, credit card numbers, credentials, social security numbers).

At step 410, cyber-security system 201 may scan a consumer device to determine potential security threats. The cyber-security system 201 may determine characteristics of any discovered device (e.g., device type, model numbers, operating systems, software versions, applications installed on the devices, or network capabilities). The determined characteristics may include operating system version, update history, installed software, hardware characteristics, and so forth.

At step 415, cyber-security system 201 may associate the consumer device and the results of the scan with the generated consumer profile. In an embodiment, cyber-security system 201 may update the consumer profile based on the results of subsequent scans.

In accordance with another embodiment, cyber-security system 201 at step 420 may monitor the Surface Web, Deep Web, and Dark Web to collect information related possible cyber-attacks. Once cyber-security system 201 determines that cyber-attack has occurred or is occurring, it may generally alert all consumers of the cyber-attack without specifically targeting certain consumers. Alternatively or additionally, cyber-security system 201 will compare the criteria used to select the victims of the cyber-attack to the collected consumer profiles. If certain profiles match the criteria used to select the victims, cyber-security system 201 warns the consumers of an upcoming potential security threat. Alternatively or additionally, the cyber-security system 201 may analyze which consumer accounts were specifically breached. The cyber-security system 201 then may alert individual consumers whether or not their account was breached. Alternatively, cyber-security system 201 may suggest to the consumer to change passwords or close compromised accounts.

At step 425, cyber-security system 201 generates a list of compromised accounts. Cyber-security system 201 may then determine the method to notify the consumer that one or more pieces of their personal information has been compromised in a cyber-attack. In another embodiment, cyber-security system 201 at step 430 may automatically initiate closing of select accounts determined to be at risk from a cyber-attack. In another embodiment, cyber-security system 201 may generate recommendations based on the identification of cyber-attack.

In yet another embodiment, cyber-security system 201 may learn to identify false positives as it repeatedly scans the web and receives feedback from consumers. In another embodiment, consumers may be able to identify accounts that should remain open though they appear to be vulnerable to a cyber-attack. These accounts may be selected by the consumer via a user interface so that false positives are further reduced.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A cyber-security system comprising a cyber-security account analysis system and a cyber-security data processing system, wherein the cyber-security system includes:
 a processor;
 a memory unit storing computer-executable instructions, which when executed by the processor, cause the cyber-security account analysis system to:
  generate a consumer profile of a consumer based on consumer information;
  scan a consumer device to determine potential security threats;
  associate the consumer device and the results of the scan with the generated consumer profile;
 wherein the cyber-security data processing system is configured to:
  monitor at least the Dark Web;
  determine whether a cyber-attack is occurring;
  determine, based on the consumer profile and a criteria being used to determine targets of the cyber-attack, that the consumer is a potential target of an upcoming cyber-attack; and
  proactively notify the consumer of the upcoming cyber-attack.

2. The cyber-security system of claim 1, wherein to determine that the consumer is the potential target of the upcoming cyber-attack, the cyber-security data processing system is further configured to:
 compare the criteria used to determine targets of the cyber-attack with the consumer profile; and
 wherein the cyber-security data processing system is further configured to, if the criteria used to determine targets of the cyber-attack matches the consumer profile, notify the consumer of profile match with criteria for cyber-attack.

3. The cyber-security system of claim 2, wherein the cyber-security data processing system is further configured to:
 determine whether the consumer's data was compromised during the cyber-attack; and notify the consumer whether consumer's data was compromised during the cyber-attack.

4. The cyber-security system of claim 3, wherein the cyber-security data processing system is further configured to:
monitor at least one of the Surface Web, Deep Web, or Dark Web, using the consumer profile, for unauthorized use of the consumer's data;
notify consumer of unauthorized use of the consumer's data.

5. The cyber-security system of claim 4, wherein the cyber-security data processing system is further configured to:
recommend closing consumer accounts based on the criteria used to determine targets of the cyber-attack.

6. The cyber-security system of claim 1, wherein the cyber-security data processing system is further configured to:
receive additional consumer information; and
update the generated consumer profile.

7. The cyber-security system of claim 1, wherein the cyber-security data processing system is further configured to:
determine an amount of confidential information of the consumer available electronically on social media networks and the Internet.

8. The cyber-security system of claim 1, wherein the consumer profile comprises at least of one of: type of operating system installed on the consumer device, type of the consumer device, geographical region of where the consumer device is located, model number of the consumer device, software version of the consumer device, application installed on the consumer device, or network capabilities of the consumer device.

9. The cyber-security system of claim 1, wherein the cyber-security data processing system is further configured to:
identify an enterprise whose assets are being used for the occurring cyber-attack; and
notify the enterprise of the occurring cyber-attack.

10. The cyber-security system of claim 1, wherein the cyber-security data processing system is further configured to:
prompt a confirmation of an information in the consumer profile; and
update the consumer profile based on the confirmation of the information by the consumer.

11. The cyber-security system of claim 1, wherein the cyber-security data processing system is further configured to:
determine a channel to proactively notify the consumer of the upcoming potential cyber-attack against the consumer.

12. The cyber-security system of claim 1, wherein the cyber-security data processing system is further configured to:
learn to identify false positives based on feedback received from a plurality of consumers.

13. A method comprising:
generating a consumer profile based on consumer information;
scanning a consumer device to determine potential security threats;
associating the consumer device and the results of the scan with the generated consumer profile;
monitoring at least the Dark Web;
determining whether a cyber-attack is occurring;
determining a criteria being used to determine targets of the cyber-attack;
comparing the criteria used to determine targets of the cyber-attack with the consumer profile; and
if the criteria used to determine targets of the cyber-attack matches the consumer profile, proactively notify consumer of an upcoming potential cyber-attack against the consumer.

14. The method of claim 13, further comprising:
recommending closing consumer accounts based on the criteria used to determine targets of the cyber-attack.

15. The method of claim 13, further comprising:
receiving additional consumer information; and
updating the generated consumer profile.

16. The method of claim 13, further comprising:
monitoring at least one of the Surface Web, Deep Web, or Dark Web for signs of a specific consumer's profile being used in a cyber-attack.

17. A cyber-security system comprising a cyber-security account analysis system and a cyber-security data processing system, wherein the cyber-security system includes:
a processor;
a memory unit storing computer-executable instructions, which when executed by the processor, cause the cyber-security account analysis system to:
generate a consumer profile based on consumer information;
scan a consumer device to determine potential security threats;
associate the consumer device and the results of the scan with the generated consumer profile;
wherein the cyber-security data processing system is configured to:
monitor at least the Dark Web;
determine whether a cyber-attack is occurring;
determine a criteria being used to determine targets of the cyber-attack;
compare the criteria used to determine targets of the cyber-attack with the consumer profile;
if the criteria used to determine targets of the cyber-attack matches the consumer profile, proactively notify consumer of an upcoming potential cyber-attack against the consumer; and
recommend closing consumer accounts based on the criteria used to determine targets of the cyber-attack.

18. The cyber-security system of claim 17, wherein the cyber-security data processing system is further configured to:
receive additional consumer information; and
update the generated consumer profile.

19. The cyber-security system of claim 17, wherein the cyber-security data processing system is further configured to:
monitor at least one of the Surface Web, Deep Web, or Dark Web for signs of a specific consumer's profile being used in a cyber-attack.

20. The cyber-security system of claim 17, wherein cyber-security data processing system is further configured to:
display a hyperlink for each listed account to enable the consumer to close an account upon hyperlink activation.

* * * * *